United States Patent
Selektor et al.

(10) Patent No.: US 6,803,855 B2
(45) Date of Patent: Oct. 12, 2004

(54) METHOD FOR REDUCING AVERAGE CURRENT CONSUMPTION IN DUTY-CYCLED RF SYSTEMS

(75) Inventors: Vitaliy Selektor, Troy, MI (US); John R. Costello, Rochester Hills, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 217 days.

(21) Appl. No.: 10/243,783

(22) Filed: Sep. 13, 2002

(65) Prior Publication Data

US 2003/0048176 A1 Mar. 13, 2003

Related U.S. Application Data

(60) Provisional application No. 60/318,947, filed on Sep. 13, 2001.

(51) Int. Cl.[7] .................................................. G08B 1/08
(52) U.S. Cl. ............................. 340/539.3; 340/539.26; 340/426.13; 340/426.36
(58) Field of Search ....................... 340/426.13, 426.36, 340/539.1, 539.11, 539.22, 539.26, 539.27, 539.3, 657, 658, 664; 455/67.1, 196.1, 226.1

(56) References Cited

U.S. PATENT DOCUMENTS

| | | | | |
|---|---|---|---|---|
| 5,649,320 A | * | 7/1997 | Korhonen et al. | ........ 455/196.1 |
| 6,091,441 A | * | 7/2000 | Al-Araji et al. | ........... 455/3.02 |
| 6,148,188 A | * | 11/2000 | Sullivan | .................. 455/226.1 |
| 6,584,332 B2 | * | 6/2003 | Yoshitake et al. | .......... 505/210 |

* cited by examiner

Primary Examiner—Van T. Trieu

(57) ABSTRACT

A method for reducing average current consumption in an RF system adjusts RF stabilization time by measuring the temperature of the operating environment. The RF system includes a RF receiver that has a predetermined base RF receiver stabilization time. A temperature sensor takes at least one temperature measurement of the environment in which the RF receiver operates. The base RF receiver stabilization time is then adjusted based on the temperature measurement.

16 Claims, 1 Drawing Sheet

METHOD FOR REDUCING AVERAGE CURRENT CONSUMPTION IN DUTY-CYCLED RF SYSTEMS

CROSS-REFERENCE TO RELATED APPLICATIONS

The application claims priority to U.S. Provisional Application No. 60/318,947, which was filed on Sep. 13, 2001.

BACKGROUND OF THE INVENTION

This invention relates to a method and system that reduces the average current consumption in a duty-cycled radio frequency (RF) receiver. Specifically, an RF receiver stabilization time is adjusted based on temperature measurements of the RF receiver operational environment.

RF systems typically include a transmitter that transmits a signal and an RF receiver that receives and responds to the signal from the transmitter. One example of such a system is in a remote keyless entry (RKE) system for a vehicle. A transmitter in a key fob transmits a signal to a receiver in the vehicle to unlock the vehicle doors.

These RKE systems are periodically placed in an active mode even when the vehicle is parked or is otherwise in a non-operational mode. The RF receiver is periodically activated to look for input data from the transmitter. A vehicle battery traditionally provides the power for the RF receiver. Each time the RF receiver is activated, the receiver must remain on until a receiver stabilization time has been achieved. The receiver stabilization time unique to each different type of RF receiver and is defined as the length of time needed to guarantee a valid output response from the RF receiver.

Typically, RF receivers have a longer stabilization time at lower temperatures. Current RF systems must wait for the worst case stabilization time for the RF receiver at all temperatures. For example, if a stabilization time of 6 milliseconds is required at lower temperatures, then the RF receiver remains on during an activation interval for 6 milliseconds at all temperatures. This results in a higher average current consumption over time, which in turn can drain the vehicle battery.

Thus, it is desirable to have a method and system that can reduce the average current consumption for an RF receiver in a duty-cycled application, as well as overcoming the other above-mentioned deficiencies with the prior art.

SUMMARY OF THE INVENTION

The system and method for reducing average current consumption in an RF system utilizes temperature sensing to adjust stabilization time. The stabilization time is defined as a period of time needed to produce a valid output response signal. The RF system includes a RF receiver that has a predetermined base RF receiver stabilization time. At least one temperature of a RF receiver operational environment is measured and the base RF receiver stabilization time is adjusted based on the measured temperature.

In one disclosed embodiment, the RF system is used in a remote keyless entry system in a vehicle. A transmitter is located in a key fob and a RF receiver is located within the vehicle. The RF receiver is periodically activated at a predetermined activation interval to search for input data. The temperature of the RF receiver operational environment is measured by at least one temperature sensor and the base RF receiver stabilization time is adjusted based on the temperature data to define an adjusted RF receiver stabilization time. The temperature that is measured can be either an external temperature, i.e. the temperature outside the vehicle, or an internal temperature, i.e. the temperature inside the vehicle.

In one disclosed embodiment, the adjusted RF receiver stabilization time is greater than or equal to the base RF receiver stabilization time if the temperature is below a predetermined limit and the adjusted RF receiver stabilization time is less than the base RF receiver stabilization time if the temperature is above a predetermined limit.

Preferably, at least one temperature of the operational environment is measured during each of the predetermined activation intervals and a control unit adjusts the base RF receiver stabilization time during each activation interval accordingly. The RF receiver includes a maximum current consumption average based on a predetermined maximum constant RF receiver stabilization time for all temperatures. A discrete adjusted RF receiver stabilization time is thus determined for each of the activation intervals. A measured average current consumption is determined by combining a plurality of the discrete adjusted RF receiver stabilization times compiled over time. The measured average current consumption is thus maintained at a current level below the maximum current consumption average as a result of adjustments made in response to the temperature measurements.

The subject system and method reduces the overall current consumption for an RF receiver in a duty-cycled application, which in turn reduces unnecessary drain on a power source. These and other features of the present invention can be best understood from the following specifications and drawings, the following of which is a brief description.

DETAILED DESCRIPTION OF A PREFERRED EMBODIMENT

Figure 1:
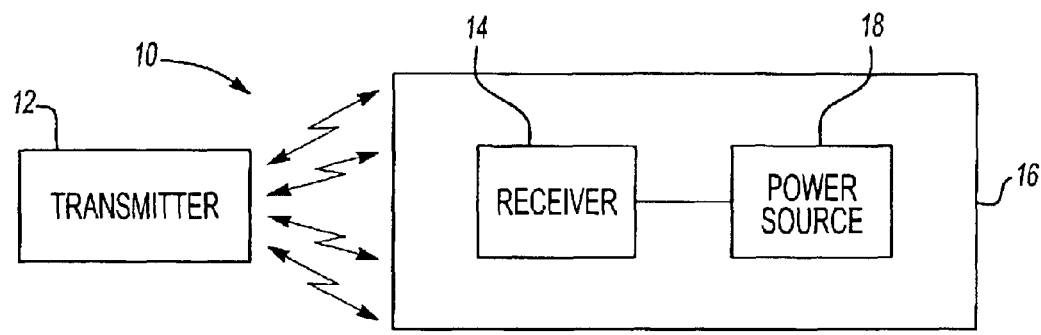
FIG. 1 is a schematic diagram of an RF system incorporating the subject invention.

A remote control system is shown generally at 10 in FIG. 1. The remote control system 10 utilizes a radio frequency (RF) control. The system 10 includes a transmitter 12 remotely located from an RF receiver 14 mounted within a housing 16. The RF receiver 14 is operably connected to a power source 18.

The remote control system 10 can be used in any type of application, however, in one disclosed embodiment, the system 10 is used in a remote keyless entry (RKE) system in a vehicle. The transmitter 12 is located in a key-fob and the RF receiver 14 is mounted within the housing 16 in a vehicle. The power source 18 in this application is a vehicle battery.

The remote control system 10 is a duty-cycled system that is periodically activated even when the application is in a non-operational mode. For example, the remote control system 10 for an RKE system is periodically activated even when the vehicle is parked with the ignition turned off. During this non-operational mode, the RF receiver 14 is periodically activated at predetermined activation intervals to search for input data.

The RF receiver 14 includes a base RF receiver stabilization time that is defined as a minimum period of time for producing a valid output signal in response to receipt of input data. The length of the base RF receiver stabilization time varies according to the type of RF receiver that is being used. As the RF receiver is operably connected to a power source 18, such as a vehicle battery, it is important to minimize the length of the RF receiver stabilization time. The average current consumption of an RF receiver can be reduced by adjusting the base RF receiver stabilization time in response to a temperature measurement.

Figure 2:
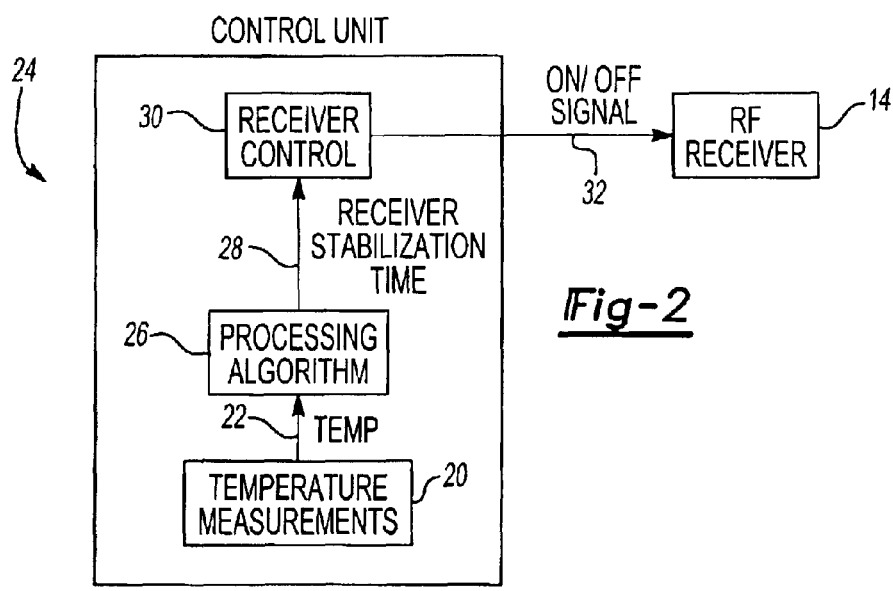
FIG. 2 is a flowchart describing a method incorporating the subject invention.

As shown in FIG. 2, at least one temperature sensor 20 is used to measure the temperature of the environment in which the RF receiver operates. This temperature sensor 20 can be any type of temperature sensor known in the art and can measure either an external temperature (outside the vehicle) or an internal temperature (inside the engine or passenger compartment of the vehicle). The base RF receiver stabilization time is adjusted based on the temperature measurements to define an adjusted RF receiver stabilization time. For example, the base RF receiver stabilization time can be increased or kept the same if the temperature is below a predetermined limit and decreased if the temperature is above a predetermined limit. Once the adjusted RF receiver stabilization time has been satisfied and no input data has been received the RF receiver 14 is deactivated and remains inactive until the next activation interval.

Preferably, at least one temperature measurement is taken during each predetermined activation interval as time passes and the base RF receiver stabilization time is adjusted for each activation interval based on the temperature measurement of the respective activation interval. Thus, a discrete adjusted RF receiver stabilization time is determined for each activation interval.

A plurality of discrete adjusted RF receiver stabilization times are compiled over a predetermined time to determine a measured average current consumption. The specification for each unique RF receiver 14 includes a pre-defined maximum current consumption average based on a maximum constant RF receiver stabilization time for all temperatures. Because the base RF receiver stabilization time is adjusted in response to variations in operational temperatures, the measured average current consumption is maintained at a current level below the maximum current consumption average. One benefit of reduced average current consumption is to minimize unnecessary drain on the power source 18.

As shown in FIG. 2, the temperature sensor 20 generates a temperature signal 22 that is transmitted to a control unit 24. The control unit 24 can be any type of control unit known in the art. Further, the control unit 24 can be comprised of multiple processing units or a single unit. Once the control unit 24 receives the temperature signal 22, the information is processed at step 26 to determine whether or not the base stabilization time should be adjusted. A signal 28 representing the adjusted RF receiver stabilization time is sent to a RF receiver control 30. Once the RF receiver control 30 receives the adjusted signal 28, a signal 32 is transmitted to the RF receiver 14. The signal 32 activates the RF receiver 14 for the adjusted stabilization time for the respective activation interval. The process is repeated for each subsequent activation interval.

Figure 3:
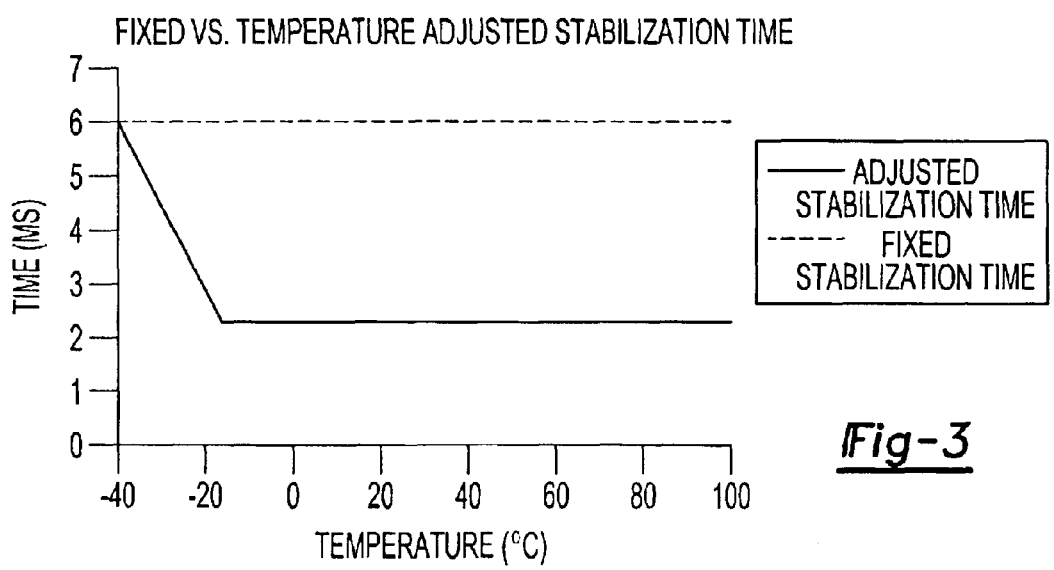
FIG. 3 is a graph showing Fixed vs. Temperature Adjusted Stabilization Time for one embodiment of an RF system incorporating the subject invention.

One example of the data for one type of RF receiver 14 is shown in FIG. 3 in a graph entitled Fixed vs. Temperature Adjusted Stabilization Time. The fixed stabilization time is indicated by the dashed line and is fixed at 6 milliseconds for all temperatures. Thus, no matter what temperature the RF receiver 14 is operating in, the RF receiver stabilization time is always 6 milliseconds. The data for the stabilization time adjusted in response to temperature measurements is indicated by the solid line. At a temperature of −40 degrees Celsius, the stabilization time is 6 milliseconds, however, between −40 degrees Celsius and −20 degrees Celsius the stabilization time infinitely varies between 6 milliseconds and 2 milliseconds in a linear relationship. At any temperature above −20 degrees Celsius, the stabilization time is indicated as 2 milliseconds.

It should be understood that the data shown in FIG. 3, is merely representative of one example of an RF receiver 14 and that other adjusted curve profiles could be used. For example, depending on the type of RF receiver 14 used, the curve could indicate a linear relationship for all temperatures, i.e., have a different stabilization time at each temperature, or could be bell-shaped or inverse bell-shaped to have similar stabilization times at high and low temperatures with variable stabilization times between the high and low temperatures.

The subject invention provides a method and apparatus for reducing the average current consumption rate for an RF receiver 14 in a duty-cycled application by adjusting receiver stabilization time in response to temperature measurements. This significantly reduces unnecessary drain on the power source 18. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for reducing average current consumption in an RF system comprising the steps of:
   (a) determining a base RF receiver stabilization time;
   (b) measuring a temperature of a RF receiver operational environment; and
   (c) adjusting the base RF receiver stabilization time based on the temperature measured in step (b).

2. A method as set forth in claim 1 including the step of increasing the base RF receiver stabilization time if the temperature is below a predetermined limit.

3. A method as set forth in claim 1 including the step of decreasing the base RF receiver stabilization time if the temperature is above a predetermined limit.

4. A method as set forth in claim 1 including the steps of periodically activating a RF receiver at a predetermined interval to search for input data, defining the base RF receiver stabilization time as a minimum period of time for producing a valid output signal in step (a), defining an adjusted RF receiver stabilization time in step (c), and deactivating the RF receiver after the adjusted RF receiver stabilization time has been satisfied and no input data has been received.

5. A method as set forth in claim 1 wherein step (b) further includes taking a plurality of temperature measurements over time and step (c) further includes continually adjusting the base RF receiver stabilization time in response to temperature variations over time measured in step (b).

6. A method as set forth in claim 5 including the steps of:
   (d) determining a discrete adjusted RF receiver stabilization time for each activation interval;
   (e) compiling a plurality of adjusted RF receiver stabilization times over a predetermined time; and
   (f) determining a measured average current consumption based on data from step (e).

7. A method as set forth in claim 6 including the steps of defining a maximum current consumption average based on a maximum constant RF receiver stabilization time for all temperatures and maintaining the measured average current consumption at a current level below the maximum current consumption average.

8. A method for reducing average current consumption by an RF receiver for a remote keyless entry system comprising the steps of:
   (a) periodically activating a RF receiver at a predetermined activation interval to search for input data;
   (b) defining a base RF receiver stabilization time as a minimum period of time for producing a valid output signal;
   (c) measuring a temperature of an RF receiver operational environment with at least one temperature sensor;
   (d) adjusting the base RF receiver stabilization time based on temperature data from step (c) to define an adjusted RF receiver stabilization time; and
   (e) deactivating the RF receiver after the adjusted RF receiver stabilization time has been satisfied and no input data has been received.

9. A method as set forth in claim 8 wherein step (c) further includes taking at least one temperature measurement during each predetermined activation interval over time and step (d) further includes continually adjusting the base RF receiver stabilization time for each activation interval over time based on the temperature measurement of step (c).

10. A method as set forth in claim 9 including the steps of:
   (f) determining a discrete adjusted RF receiver stabilization time for each activation interval;
   (g) compiling a plurality of discrete adjusted RF receiver stabilization times over a predetermined time; and
   (h) determining a measured average current consumption based on data from step (g);
   (i) defining a maximum current consumption average based on a maximum constant RF receiver stabilization time for all temperatures; and
   (j) maintaining the measured average current consumption at a current level below the maximum current consumption average.

11. A method as set forth in claim 8 further including the steps of increasing the base RF receiver stabilization time if the temperature is below a predetermined limit and decreasing the base RF receiver stabilization time if the temperature is above a predetermined limit.

12. A controller for an RF receiver in a remote keyless entry system comprising:
   an RF receiver having a base RF receiver stabilization time defined as a minimum period of time for producing a valid output signal;
   at least one temperature sensor for measuring a temperature of an operational environment of said RF receiver and generating a corresponding temperature signal; and
   a control unit for receiving said temperature signal and for periodically activating said RF receiver at a predetermined activation interval to search for input data wherein said control unit adjusts said base RF receiver stabilization time based said temperature signal to define an adjusted RF receiver stabilization time.

13. A controller as set forth in claim 12 wherein said control unit deactivates said RF receiver after said adjusted RF receiver stabilization time has been satisfied and no input data has been received.

14. A controller as set forth in claim 12 wherein said at least one temperature sensor measures at least one temperature of said operational environment of said RF receiver during each of said predetermined activation intervals and generates a discrete activation interval temperature signal and wherein said control unit adjusts said base RF receiver stabilization time during each activation interval in response to said discrete activation interval temperature signal.

15. A controller as set forth in claim 14 wherein said RF receiver includes a maximum current consumption average based on a maximum constant RF receiver stabilization time for all temperatures and wherein said control unit determines a discrete adjusted RF receiver stabilization time for each of said activation intervals, determines a measured average current consumption by combining a plurality of said discrete adjusted RF receiver stabilization times, and maintains said measured average current consumption at a current level below said maximum current consumption average.

16. A controller as set forth in claim 12 wherein said adjusted RF receiver stabilization time is greater than or equal to said base RF receiver stabilization time if the temperature is below a predetermined limit and said adjusted RF receiver stabilization time is less than said base RF receiver stabilization time if the temperature is above a predetermined limit.

* * * * *